June 9, 1964 R. C. MACKEY 3,136,950
DOUBLE SIDEBAND SUPPRESSED CARRIER BALANCED MODULATOR USING A FERRITE CIRCULATOR
Filed Oct. 2, 1961
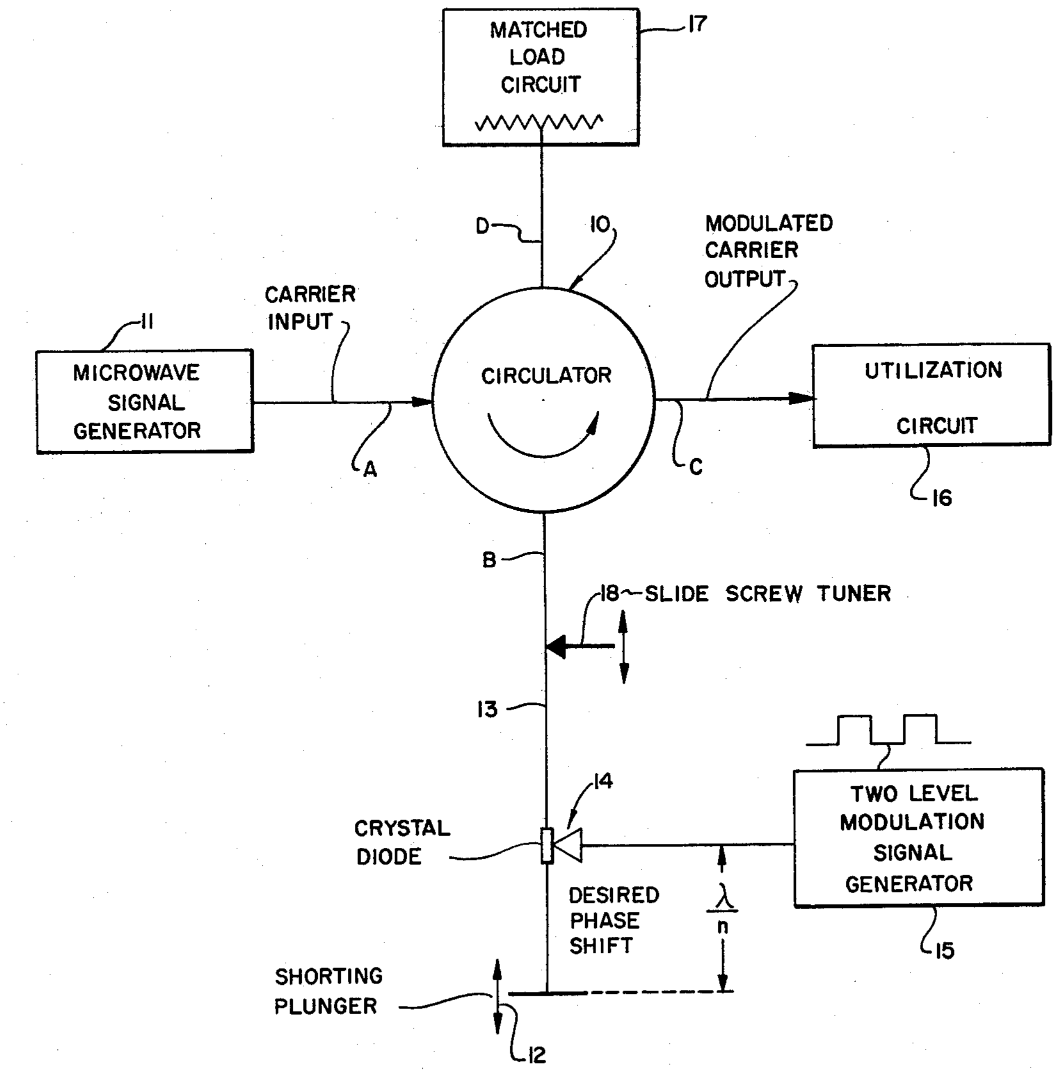
RICHARD C. MACKEY
*INVENTOR.*
BY
AGENTS.

United States Patent Office 3,136,950

Patented June 9, 1964

3,136,950

DOUBLE SIDEBAND SUPPRESSED CARRIER BALANCED MODULATOR USING A FERRITE CIRCULATOR

Richard C. Mackey, Reseda, Calif., assignor to Space Technology Laboratories, Inc., Los Angeles, Calif., a corporation of Delaware Filed Oct. 2, 1961, Ser. No. 142,246
9 Claims. (Cl. 325—138)

This invention relates primarily to modulators and more specifically to a microwave balanced modulator in which double sidebands are generated and the carrier signals are suppressed.

A conventional balanced modulator is a device in which the modulation signal and carrier are combined in a preferred manner that cancels the carrier component and reinforces the sideband components. This invention is concerned with a modulator having unique characteristics resulting from the use of a modulation signal of the binary form for switching the bias on a diode from a forward to a reverse direction. Typical waveforms of the modulation signal may be, for example, symmetrical square waves, rectangular periodic, or rectangular pseudo-random.

In this invention there is disclosed a preferred embodiment of the modulator employing a ferrite circulator having a plurality of ports identified serially in the direction of propagation of energy in said circulator. A microwave carrier signal is generated and directed into a first port. A transmission line terminated at one end is connected at the other end to a second port. The transmission line contains a controllable shorting means preferably in the form of a crystal diode located intermediate said second port and said terminated end of said line. The distance between said crystal diode and said terminated end is preferably an odd multiple of a quarter-wavelength at the operating frequency of said microwave carrier signal. However, the exact distance used is a function of the degree of modulation desired since the complete system need not be operated as a balanced modulator. The crystal diode is preferably modulated by a substantially symmetrical square wave or a sinusoidal waveform depending on the ultimate use being made of the disclosed modulator. The utilization circuit in the form of a suitable antenna is connected to a third port and a matched load terminating device is connected to a fourth port for dissipating unutilized residual energy in said circulator.

Further objects and advantages of the present invention will be described as the description progresses, reference now being made to the accompanying drawing which is a schematic diagram of a balanced modulator constructed in accordance with the principles of the present invention. There is shown a ferrite circulator 10 having four symmetrically located ports identified as A, B, C and D. A microwave carrier signal is generated by a microwave signal generator 11 and fed into port A of circulator 10. A property of circulator 10 is that energy entering port A is circulated in the direction of the arrow and leaves by means of port B. In addition any signal entering port B will be circulated around and out port C and in a similar manner energy entering port C will circulate and leave by means of port D. In order to use the device as a balanced modulator a tunable detector mount terminates port B. This termination is accomplished by means of a shorting plunger 12 located at the end of a transmission line 13 which is connected to port B. The tunable detector is preferably a crystal diode 14 located intermediate the shorting plunger 12 and the port B. A two-level modulation signal generator 15 is connected to the crystal diode 14 and controls the shorting or non-shorting characteristics of the diode by biasing the diode either in the reverse direction or in the forward direction. In the preferred mode as a balanced modulator the crystal diode 14 is located a distance measured substantially as a quarter-wavelength of the carrier frequency generated by the microwave signal generator 11 from the shorting plunger 12. A utilization circuit 16 adapted to receive the modulated carrier output signal from the circulator 10 is connected to port C. Port D is subsequently connected to a matched load circuit 17 to complete the circuit. It is well recognized that an equivalent three port circulator with a built-in matched load circulator may also be used.

In operation a microwave carrier signal enters port A and leaves the circulator by port B. This signal from port B travels along the line 13 and is reflected from the crystal diode 14 or the shorting plunger 12 depending on the modulation voltage applied to the crystal diode. For example, if the crystal is biased in the forward direction it will experience a small insertion loss and the microwave signal from port B will pass therethrough to be eventually reflected by the shorting plunger 12 which terminated the line 13. On the other hand, if the crystal is biased in the reverse direction a large insertion loss results and the microwave signal from port B will be reflected by the reverse biased crystal diode 14. The insertion loss in both cases results mainly from reflective losses with very little power being absorbed by the crystal. For operation as a balanced modulator the reflected energy from either the crystal diode 14 or the shorting plunger 12 enters port B and is circulated to port C.

For operation as a balanced modulator the phase of the signal at port C must change by 180° in accordance with the modulation signal. This condition is fulfilled when the shorting plunger 12 is adjusted to be one-qurter of a guided wavelength behind the plane of the crystal thereby causing the path length from port A to port C to be changed by one-half a guided wavelength. For X-band operation it has been determined that carrier suppression varies between 20 and 30 db depending upon the crystal used, but may be increased to greater than 50 db by the addition of a slide screw tuner 18 on the line 13 located between the crystal diode 14 and port B. The tuning of the disclosed modulator is very straightforward compared to prior art devices and less critical. With a square wave of modulation applied, from the generator 15 the shorting plunger 12 is adjusted for minimum carrier amplitude at the utilization circuit 16 and then final carrier null will be achieved with the reactive slide screw tuner 18.

It can be demonstrated mathematically that the balanced modulator is in reality a special case of phase modulation and that there is an equivalence between phase modulation and balanced modulation. For the particular case of a rectangular modulation waveform and a phase modulation index of $\pi/2$ the equivalence will be demonstrated.

Consider the expression for a carrier amplitude modulated by a function of time $f(t)$ of unit amplitude $$e(t)=E[1+m_a f(t)] \cos \omega_c t$$

where $m_a$ is the modulation index and $\omega_c$ is the carrier frequency.

For the case of a rectangular waveform of unit amplitude $f(t)=\pm 1(t)$ with the time dependence not specified; then, $$e(t)=E[1\pm m_a(t)] \cos \omega_c t$$

The balanced modulator performs the operation $$e(t)=E[1+m_a(t)] \cos \omega_c t-E[1\mp m_a(t)] \cos \omega_c t$$

which combines to $$e(t)=E[\pm 2m_a(t)] \cos \omega_c t$$

The phase modulation case may be represented by $$e(t)=E \sin [\omega_c t+m_p f(t)]$$

where $m_p$ is the phase modulation index.

For $f(t)$ again equal to $\pm 1(t)$ and $m_p=\pi/2$, $$e(t)=E \sin [\omega_c t \pm \pi/2(t)]$$
$$e(t)=\pm E(t) \cos \omega_c t$$

This equivalence is the basis of operation of a number of microwave balanced modulators. Phase modulation therefore is accomplished by applying the modulation signal to the microwave crystal diode thereby causing a variation in reflection coefficient. The described device may obviously be used to provide bi-phase modulation of any degree as determined by the position of the shorting plunger with respect to the crystal diode. The relationship is:

$$\phi=\frac{2\pi l}{\lambda_g}$$

where:

$\phi$=phase shift in radians
$l$=length between diode and shorting plunger
$\lambda_g$=guided wavelength This completes the description of the embodiment of the invention illustrated herein. However, many modifications and advantages thereof will be apparent to persons skilled in the art without departing from the spirit and scope of this invention. For example, many other types of controllable shorting devices other than a crystal diode may be used. In addition it is contemplated that different types of modulating signals such as sinusoidal modulation may be used since the modulation amplitude and source impedance cause the diode to be operated essentially in a switching mode.

Accordingly, it is desired that this invention not be limited to the particular details of the embodiment disclosed herein, except as defined by the appended claims.

The embodiments of the invention in which an exclusive property or privilege is claimed are defined as follows:

1. A modulator comprising a ferrite circulator having a plurality of ports identified serially in the direction of propagation of energy in said circulator, means for generating a microwave signal and directing said signal into a first port, a transmission line terminated at one end and connected at the other end to a second port, said transmission line containing a controllable shorting means located intermediate said second port and said terminated end of said line, said controllable shorting means being spaced a distance substantially equal to an odd multiple of a quarter-wavelength at the operating frequency of said microwave carrier signal from said shorted end of said transmission line, means for modulating said controllable shorting means from a substantially non-shorting condition to a shorting condition, a utilizing circuit connected to a third port for receiving said modulated carrier output signal, and means connecting said ferrite circulator for dissipating unutilized residual energy in said circulator.

2. A modulator comprising a ferrite circulator having a first, second, third and fourth port identified serially in the direction of propagation of energy in said circulator, means for generating a microwave signal and directing said signal into said first port, a transmission line terminated at one end and connected at the other end to said second port, said transmission line containing a controllable shorting means located intermediate said second port and said terminated end of said line, said controllable shorting means being spaced a distance substantially equal to an odd multiple of a quarter-wavelength at the operating frequency of said microwave carrier signal from said shorted end of said transmission line, means for modulating said controllable shorting means from a substantially non-shorting condition to a shorting condition, a utilizing circuit connected to said third port for receiving said modulated carrier output signal, and a matched terminating device connected to said fourth port for dissipating unutilized residual energy in said circulator.

3. A modulator comprising a ferrite circulator having a first, second, third and fourth port identified serially in the direction of propagation of energy in said circulator, means for generating a microwave signal and directing said signal into said first port, a transmission line terminated at one end and connected at the other end to said second port, said transmission line containing a crystal diode located intermediate said second port and said terminated end of said line, said crystal diode being spaced a distance substantially equal to an odd multiple of a quarter-wavelength at the operating frequency of said microwace carrier signal from said shorted end of said transmission line, means for modulating said crystal diode from a substantially non-shorting condition to a shorting condition, a utilizing circuit connected to said third port for receiving said modulated carrier output signal, and a matched terminating device connected to said fourth port for dissipating unutilized residual energy in said circulator.

4. A modulator comprising a ferrite circulator having a first, second, third and fourth port identified serially in the direction of propagation of energy in said circulator, means for generating a microwave signal and directing said signal into said first port, a transmission line terminated at one end and connected at the other end to said second port, said transmission line containing a crystal diode located intermediate said second port and said terminated end of said line, said crystal diode being spaced a distance substantially equal to an odd multiple of a quarter-wavelength at the operating frequency of said microwave carrier signal from said shorted end of said transmission line, means for modulating said crystal diode with a biasing current varying from a forward to a reverse direction whereby said crystal diode varies from a substantially non-shorting condition to a shorting condition, a utilizing circuit connected to said third port for receiving said modulated carrier output signal, and a matched terminating device connected to said fourth port for dissipating unutilized residual energy in said circulator.

5. A modulator comprising a ferrite circulator having a first, second, third and fourth port identified serially in the direction of propagation of energy in said circulator, means for generating a microwave signal and directing said signal into said first port, a transmission line terminated at one end by a variable position shorting plunger and connected at the other end to said second port, said transmission line containing a controllable shorting means located intermediate said second port and said terminated end of said line, said controllable shorting means being spaced a distance substantially equal to an odd multiple of a quarter-wavelength at the operating frequency of said microwave carrier signal from said shorted end of said transmission line, a tuning means located on said transmission line between said second port and said controllable shorting means, means for modulating said controllable shorting means from a substantially non-shorting condition to a shorting condition, a utilizing circuit connected to said third port for receiving said modulated carrier output signal, and a matched terminating device connected to said fourth port for dissipating unutilized residual energy in said circulator.

6. A balanced modulator comprising a ferrite circulator having a first, second, third and fourth port identified serially in the direction of propagation of energy in said circulator, means for generating a microwave signal and directing said signal into said first port, a transmission line terminated at one end and connected at the other end to said second port, said transmission line containing a controllable shorting means located intermediate said second port and said terminated end of said line, modulating means for modulating said controllable shorting means from a substantially non-shorting condition to a shorting condition, said controllable shorting means being spaced a distance substantially equal to an odd multiple of a quarter-wavelength at the operating frequency of said microwave carrier signal from said shorted end of said transmission line for causing the modulated carrier signal at said third port to change 180° in accordance with said modulation means, a utilizing circuit connected to said third port for receiving said modulated carrier output signal, and a matched terminating device connected to said fourth port for dissipating unutilized residual energy in said circulator.

7. A balanced modulator comprising a ferrite circulator having a first, second, third and fourth port identified serially in the direction of propagation of energy in said circulator, means for generating a microwave signal and directing said signal into said first port, a transmission line terminated at one end and connected at the other end to said second port, said transmission line containing a crystal diode located intermediate said second port and said terminated end of said line, modulating means for modulating said crystal diode from a substantially non-shorting condition to a shorting condition, said crystal diode being spaced a distance substantially equal to an odd multiple of a quarter-wavelength at the operating frequency of said microwave carrier signal from said shorted end of said transmission line for causing the modulated carrier signal at said third port to change 180° in accordance wtih said modulation means, a utilizing circuit connected to said third port for receiving said modulated carrier output signal, and a matched terminating device connected to said fourth port for dissipating unutilized residual energy in said circulator.

8. A balanced modulator comprising a ferrite circulator having a first, second, third and fourth port identified serially in the direction of propagation of energy in said circulator, means for generating a microwave signal and directing said signal into said first port, a transmission line terminated at one end by a variable position shorting plunger and connected at the other end to said second port, said transmission line containing a crystal diode located intermediate said second port and said terminated end of said line, modulating means for modulating said crystal diode from a substantially non-shorting condition to a shorting condition, said crystal diode being spaced a distance substantially equal to an odd multiple of a quarter-wavelength at the operating frequency of said microwave carrier signal from said shorted end of said transmission line for causing the modulated carrier signal at said third port to change 180° in accordance with said modulation means, a slide screw tuner located on said transmission line between said second port and said crystal diode, a utilizing circuit connected to said third port for receiving said modulated carrier output signal, and a matched terminating device connected to said fourth port for dissipating unutilized residual energy in said circulator.

9. A bi-phase modulator comprising a ferrite circulator having a plurality of ports identified serially in the direction of propagation of energy in said circulator, means for generating a microwave signal and directing said signal into a phase shift, a transmission line terminating at one end and connected at the other end to a second port, said transmission line containing a controllable shorting means located intermediate said second port and said terminated end of said line, the phase modulation being determined by the distance between said controllable shorting means from said shorted end of said transmission line, said phase shift being determined by the following relationship:

$$\phi=\frac{2\pi l}{\lambda_g}$$

where:

$\phi$=phase shift in radians
$l$=length between said controllable shorting means and said shorted end of said transmission line
$\lambda_g$=guided wavelength, means for modulating said controllable shorting means from a substantially non-shorting condition to a shorting condition, a utilizing circuit connected to a third port for receiving said modulated carrier output signal, and means connecting said ferrite circulator for dissipating unutilized residual energy in said circulator.

References Cited in the file of this patent

UNITED STATES PATENTS 2,981,837 Ruthroff ---------------- Apr. 25, 1961
2,994,828 Ruthroff ----------------- Aug. 1, 1961